United States Patent [19]
Franke et al.

[11] Patent Number: 4,476,575
[45] Date of Patent: Oct. 9, 1984

[54] RADIO TRANSCEIVER

[75] Inventors: Earnest A. Franke, Goode; Frederick J. Highton, Lynchburg, both of Va.

[73] Assignee: General Electric Company, Lynchburg, Va.

[21] Appl. No.: 449,543

[22] Filed: Dec. 13, 1982

[51] Int. Cl.³ ............................................. H04B 1/50
[52] U.S. Cl. ......................................... 455/76; 455/78
[58] Field of Search ................................. 455/76–78, 455/19, 24, 82, 86, 87

[56] References Cited
U.S. PATENT DOCUMENTS

| | | |
|---|---|---|
| 3,825,830 | 7/1974 | O'Connor ............................ 455/86 |
| 3,944,925 | 3/1976 | De Laune .............................. 455/86 |
| 4,097,805 | 6/1978 | Fujii et al. ............................ 455/76 |
| 4,194,151 | 3/1980 | Gregersen et al. ................... 455/76 |
| 4,310,923 | 1/1982 | Kennedy ............................... 455/79 |

Primary Examiner—Marc E. Bookbinder
Attorney, Agent, or Firm—James J. Williams

[57] ABSTRACT

A radio transceiver has a single reference oscillator and a receiving frequency synthesizer and a transmitting frequency synthesizer. The synthesizer frequencies are selected so that the receiving intermediate frequency and a transmitting intermediate frequency (produced by the transmitted frequency mixing with the received frequency) are spaced widely apart. Thus, any beat note between the two intermediate frequencies is outside the passband or filter bandwidth in the receiver circuit.

6 Claims, 4 Drawing Figures

| LINE NO. | RECEIVING FREQUENCY RF | RECEIVING LOCAL OSCILLATOR FREQUENCY RLOF | RECEIVING INTERMEDIATE FREQUENCY RIF | TRANSMITTING LOCAL OSCILLATOR FREQUENCY TLOF | TRANSMITTING FREQUENCY TF | TRANSMITTING INTERMEDIATE FREQUENCY TIF | BEAT NOTE |
|---|---|---|---|---|---|---|---|
| 1 | 870.030 | 915.030 | 45.000 | 90.000 | 825.030 | 45.000 | 0.000 |
| 2 | 870.030 | 915.031 | 45.001 | 90.000 + | 825.031 | 44.999 | 0.002 |
| 3 | 870.030 | 915.029 | 44.999 | 90.000 − | 825.029 | 45.001 | 0.002 |
| 4 | 825.030 | 780.030 | 45.000 | 90.000 | 870.030 | 45.000 | 0.000 |
| 5 | 825.030 | 780.031 | 44.999 | 90.000 + | 870.031 | 45.001 | 0.002 |
| 6 | 825.030 | 780.029 | 45.001 | 90.000 − | 870.029 | 44.999 | 0.002 |

FIG.2

| LINE NO. | RECEIVING FREQUENCY RF | RECEIVING LOCAL OSCILLATOR FREQUENCY RLOF | RECEIVING INTERMEDIATE FREQUENCY RIF | TRANSMITTING LOCAL OSCILLATOR FREQUENCY TLOF | TRANSMITTING FREQUENCY TF | TRANSMITTING INTERMEDIATE FREQUENCY TIF | BEAT NOTE |
|---|---|---|---|---|---|---|---|
| 1 | 870.030 | 915.000 | 44.970 | 89.970 | 825.030 | 45.000 | 0.030 |
| 2 | 870.030 | 915.001 | 44.971 | 89.970 + | 825.031 | 44.999 | 0.028 |
| 3 | 870.030 | 914.999 | 44.969 | 89.970 − | 825.029 | 45.001 | 0.032 |
| 4 | 870.030 | 915.060 | 45.030 | 90.030 | 825.030 | 45.000 | 0.030 |
| 5 | 870.030 | 915.061 | 45.031 | 90.030 + | 825.031 | 44.999 | 0.032 |
| 6 | 870.030 | 915.059 | 45.029 | 90.030 − | 825.029 | 45.001 | 0.028 |

FIG.3

| LINE NO. | RECEIVING FREQUENCY RF | RECEIVING LOCAL OSCILLATOR FREQUENCY RLOF | RECEIVING INTERMEDIATE FREQUENCY RIF | TRANSMITTING LOCAL OSCILLATOR FREQUENCY TLOF | TRANSMITTING FREQUENCY TF | TRANSMITTING INTERMEDIATE FREQUENCY TIF | BEAT NOTE |
|---|---|---|---|---|---|---|---|
| 1 | 825.030 | 780.060 | 44.970 | 89.970 | 870.030 | 45.000 | 0.030 |
| 2 | 825.030 | 780.061 | 44.969 | 89.970 + | 870.031 | 45.001 | 0.032 |
| 3 | 825.030 | 780.059 | 44.971 | 89.970 − | 870.029 | 44.999 | 0.028 |
| 4 | 825.030 | 780.000 | 45.030 | 90.030 | 870.030 | 45.000 | 0.030 |
| 5 | 825.030 | 780.001 | 45.029 | 90.030 + | 870.031 | 45.001 | 0.028 |
| 6 | 825.030 | 779.999 | 45.031 | 90.030 − | 870.029 | 44.999 | 0.032 |

FIG.4

RADIO TRANSCEIVER

BACKGROUND OF THE INVENTION

Our invention relates to a radio transceiver or communication radio transmitter and receiver, and particularly to a radio transceiver that operates on a plurality of spaced radio channels, such as in a radio telephone system.

Radio telephone systems have improved to the extent that the Federal Communications Commission has approved a nationwide cellular radio telephone system. In the cellular system, 666 channels with 30 Kilohertz spacing have been allocated. These channels lie in the band of 825 to 845 Megahertz for mobile transmitting and base station receiving; and in the band of 870 to 890 Megahertz for mobile receiving and base station transmitting. The system provides full duplex operation, so that for a given communication, two companion channels are used, these channels being separated by 45 Megahertz. Thus, communication on designated channel 1, for example, would use 825.030 Megahertz for mobile transmitting and base station receiving, and 870.030 Megahertz for mobile receiving and base station transmitting.

The electronic equipment needed in such a cellular system is obviously relatively complex. But at the same time, such equipment must meet the relatively high Federal Communications Commission standards on low noise and high frequency stability, yet must be relatively inexpensive so as to be available to as many users as possible.

A cellular transceiver for which our invention is intended uses a single, relatively stable crystal oscillator that serves as a reference for a receiving frequency synthesizer, and for a transmitting frequency synthesizer that can be modulated. In such a transceiver, the receiving frequency synthesizer output is mixed with the received frequency to produce a receiving intermediate frequency, and the receiving frequency synthesizer output is also mixed with the transmitting frequency synthesizer output to produce the transmitted frequency. Because of coupling, such as through a duplexer or adjacent antennas, between the transmitted output and received input, the high power transmitted signal may be mixed with the received signal to produce another intermediate frequency that is very close to the receiving intermediate frequency. If the crystal oscillator drifts, as it well may with changes in temperature, these two intermediate frequencies produce an audible beat note that is undesirable and may interfere with reception.

SUMMARY OF THE INVENTION

In accordance with our invention for the above described transceiver, we select the two synthesizer frequencies so that the receiving intermediate frequency and the undesired intermediate frequency are offset from each other by a predetermined minimum, despite drift in the crystal oscillator. This predetermined minimum is selected so that it is greater than the bandwidth of the receiver intermediate frequency circuit. Thus, any beat note that may result from the two intermediate frequencies is eliminated.

BRIEF DESCRIPTION OF THE DRAWING

The subject matter which we regard as our invention is particularly pointed out and distinctly claimed in the claims. The structure and operation of our invention, as well as advantages, may be better understood from the following description given in connection with the accompanying drawing, in which:

FIGS. 2, 3 and 4 show tables for explaining the operation and results provided by our invention.

DESCRIPTION OF THE PREFERRED EMBODIMENT—PRIOR ART

Figure 1:
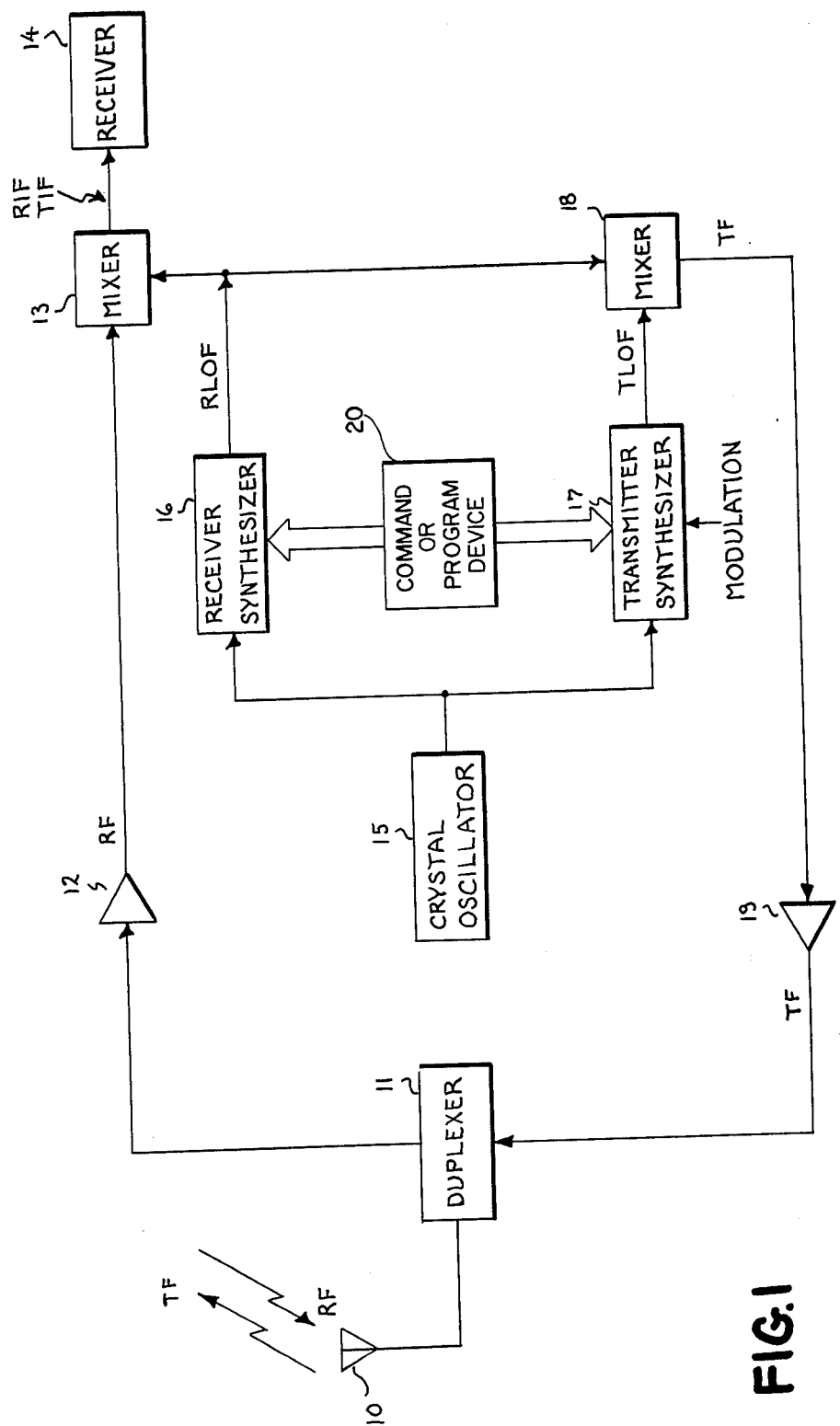
FIG. 1 shows a block diagram of a radio cellular transceiver for which our invention is intended.

FIG. 1 shows a block diagram of a radio transceiver which is known in the prior art, and for which our invention is intended. Such a transceiver can be provided in either a mobile station or a fixed station, but the problems of the prior art and the solution of our invention are equally applicable. We have assumed that the station of FIG. 1 uses a common antenna 10 for transmitting frequencies TF and receiving frequencies RF. With such a common antenna, a duplexer 11 is provided. Signals received at the antenna 10 are applied by the duplexer 11 to an amplifier 12 (if needed) whose output is applied to one input of a mixer 13. The mixer 13 produces intermediate frequencies IF which are applied to a receiver 14 that may include additional amplification, an additional mixer, a detector, and an output.

The transceiver of FIG. 1 includes a relatively stable, reference crystal oscillator 15 whose output is applied to a receiver frequency synthesizer 16 that produces a receiving local oscillator frequency RLOF that is applied to the other input of the mixer 13. The output of the oscillator 15 is also applied to a transmitter frequency synthesizer 17 which produces a transmitting local oscillator frequency TLOF that is applied to a mixer 18. The transmitter synthesizer 17 may also be modulated if desired. Each of the frequency synthesizers 16, 17 may include a voltage controlled oscillator connected in a phase locked loop to produce their respective frequencies RLOF and TLOF in accordance with a command or program device 20 and with the stability of the crystal oscillator 15.

The mixer 18 mixes the receiving local oscillator frequency RLOF and the transmitting local oscillator frequency TLOF to produce a transmitting frequency TF that may be amplified in an amplifier 19. The output of the amplifier 19 is applied to the duplexer 11 which couples the transmitting frequencies TF to the antenna 10.

As will be appreciated by persons skilled in the art, the duplexer 11 is not a perfect device, so that a reduced level of the transmitting frequencies TF are passed by the duplexer 11 into the receiving amplifier 12. As will be explained, these transmitting frequencies TF cause problems with the prior art circuit as shown and described thus far. And, these same problems exist even though separate antennas are used for transmitting and receiving, since such antennas may be in close proximity to each other so that some of the transmitting frequency energy is coupled to the separate receiving antenna.

The problems associated with the prior art circuit of FIG. 1 as described thus far can be understood by reference to the table of FIG. 2. In FIG. 2, we show columns of frequencies whose headings or designations correspond to the designations shown in FIG. 1. In line 1 of FIG. 2, we have assumed that the receiving frequency RF is 870.030 Megahertz and the companion or corresponding transmitting frequency TF is 825.030 Megahertz. If the receiving local oscillator frequency RLOF is made higher, the prior art would dictate that this frequency be 915.030 Megahertz for a difference or receiving intermediate frequency RIF of 45.000 Megahertz. Similarly, the transmitting local oscillator frequency TLOF would be 90.000 Megahertz. This transmitting local oscillator frequency TLOF is mixed with the receiving local oscillator frequency RLOF if 915.030 Megahertz to produce the transmitting frequency TF of 825.030 Megahertz. However, this transmitting frequency TF of 825.030 Megahertz may be and often is mixed in the receiving circuit with the receiving frequency RF 870.030 Megahertz to produce a transmitting intermediate frequency TIF of 45.000 Megahertz. If the frequencies are precisely at their designated values, the two intermediate frequencies RIF and TIF produce a beat note of 0.000 Megahertz which creates no problem or noise.

However, as shown in line 2 in FIG. 2, we have assumed that the oscillators are not precisely on frequency. Thus, we have assumed that the crystal oscillator frequency drifts upward so that the receiving local oscillator frequency RLOF drifts upward to a value of 915.031 Megahertz. When this frequency is mixed with the correct receiving frequency RF of 870.030 Megahertz, a receiving intermediate frequency RIF of 45.001 Megahertz is produced. This upward drift in frequency also causes the transmitting local oscillator frequency TLOF to drift upward to 90.000+ Megahertz. (Here, the + symbol indicates that the frequency is slightly higher than shown, but not sufficiently high to be shown in the three places to the right of the decimal point. This is because for a one Kilohertz drift upward for the receiving local oscillator frequency RLOF of 915.030 Megahertz, this represents one part in 915.030, a value too small to be shown for the transmitting local oscillator frequency TLOF.) With the receiving local oscillator frequency RLOF of 915.031 Megahertz, the transmitting frequency TF drifts upward to 825.031 Megahertz. This drift upward causes the receiving intermediate frequency RIF to have a value of 45.001 Megahertz, and the transmitting intermediate frequency TIF to have a value of 44.999 Megahertz. The difference between these two frequencies produces a beat note of 0.002 Megahertz (or 2 Kilohertz) which can cause noise or interference in the receiver.

Line 3 of FIG. 2 shows the situation where the receiving local oscillator frequency RLOF and the transmitting frequency TF drift downward to the indicated values. The transmitting local oscillator frequency TLOF drifts to 90.000−Megahertz. (Here, the − symbol indicates that the actual frequency is slightly less than shown.) This results in a beat note of 0.002 Megahertz.

Line 4 of FIG. 2 shows the situation where the transmitting and receiving frequencies TF and RF have been reversed and where the oscillators are precisely on frequency so that a zero beat note is produced.

Line 5 shows the reversed frequencies where they drift upward to produce a beat note of 0.002 Megahertz, and line 6 shows a drift downward to produce a beat note of 0.002 Megahertz.

Thus, with the circuit as described thus far and under the realistic and likely-to-occur conditions assumed, this prior art transceiver can produce undesired beat notes or noise that is distracting at best, and that may interfere with communications.

DESCRIPTION OF THE PREFERRED EMBODIMENT—THE INVENTION

FIGS. 3 and 4 show tables representing the transceiver oscillator frequencies which are offset in accordance with our invention so as to eliminate the undesired beat notes which are produced by the prior art as exemplified by FIG. 2. In FIG. 3 for all of the lines, we have assumed that the receiving frequency is 870.030 Megahertz and the corresponding transmitting frequency TF is 825.030 Megahertz. As shown in lines 1, 2 and 3, the offsets are below those shown in lines 1, 2 and 3 of FIG. 2. The receiving local oscillator frequency RLOF is offset by an integral multiple, in this case unity, of the channel spacing frequency CSF used in the cellular radio telephone systems. (Other offset values can of course be used.) Hence, the receiving local oscillator frequency RLOF is 915.000 Megahertz. This produces a receiving intermediate frequency RIF of 44.970 Megahertz. In order to produce the correct transmitting frequency TF of 825.030 Megahertz, the transmitting local oscillator frequency TLOF is set at the difference between the frequencies RLOF and TF, or 89.970 Megahertz. With the frequencies at their proper values, this produces a transmitting intermediate frequency TIF of 45.000 Megahertz. This transmitting intermediate frequency TIF and receiving intermediate frequency RIF produce a beat note of 0.030 Megahertz (or 30 Kilohertz) which can be filtered out or eliminated in the remainder of the receiver. The filtering may be accomplished in various ways, such as by reducing the bandwidth of the intermediate frequency amplifier stages to some suitable value less than 0.030 Megahertz.

Line 2 shows the conditions where the receiving local oscillator frequency RLOF and the transmitting local oscillator frequency TLOF drift upward. This produces a receiving intermediate frequency RIF of 44.971 Megahertz, and a transmitting intermediate frequency TIF of 44.999 Megahertz. These intermediate frequencies produce a beat note of 0.028 Megahertz which can be filtered out. In line 2, it will be noted that the transmitting frequency TF has drifted to 825.031 Megahertz which is acceptable under existing standards.

Line 3 shows the situation where the receiving local oscillator frequency RLOF and the transmitting local oscillator frequency TLOF drift downward. In this case, the transmitting frequency TF drifts to 825.029 Megahertz, an acceptable value. A beat note of 0.032 Megahertz is produced, and this can be eliminated or filtered out.

Lines 4, 5 and 6 of FIG. 3 show the offset conditions that are above the values of lines 1, 2 and 3 of FIG. 2 by an integral multiple of unity of the channel spacing. Following the explanation given above, this results in a beat note of 0.030 Megahertz when the oscillators are on frequency, a beat note of 0.032 Megahertz when the oscillators drift upward, and a beat note of 0.028 Megahertz when the oscillators drift downward. These beat notes can also be filtered out.

FIG. 4 shows the offsets in accordance with our invention for the case where the receiving frequency RF has a nominal value of 825.030 Megahertz and the transmitting frequency TF has a nominal value of 870.030 Megahertz. As shown in FIG. 4, beat notes of 0.028, 0.030, and 0.032 Megahertz are produced. These beat notes can be eliminated or filtered.

CONCLUSION

It will thus be seen that we have provided a new and improved arrangement whereby beat notes produced from synthesizers operating from a common crystal oscillator can be eliminated by offsetting the synthesizer frequencies by some predetermined amount that causes the beat notes to be outside of the bandwidth or reproducible frequencies of the receiving circuit. While we contemplate that our invention is primarily to be used in cellular radio telephone systems with channel spacings of 0.030 Megahertz, persons skilled in the art will appreciate that our invention can be used in other applications. Such persons will also appreciate that our invention is particularly suited for a cellular telephone system because the channel assignments are organized in such a way as to avoid adjacent channel interference. Adjacent cellular channels are assigned according to these rules:

(a) In cells having omni-directional transmitting antennas, adjacent channels will not be assigned in the same or in adjacent cells.

(b) In cells having directional transmitting antennas for partial coverage within a cell, adjacent channels may be assigned in adjacent cells but not at the same cell site.

Such restrictions on adjacent channel assignments permit the offsets to be only one multiple of the channel spacing frequency CSF. Other integral multiples, such as two or more, can be used. And, persons skilled in the art will appreciate that the offsets of lines 1, 2 and 3 of FIGS. 3 and 4 or the offsets of lines 4, 5 and 6 of FIGS. 3 and 4 should be used so as to provide a common center frequency for the receiving intermediate frequency RIF of either 44.970 Megahertz or 45.030 Megahertz. This would permit a single filter circuit to be used for all radios in a selected system.

While we have described the operation of our invention for the situation where the receiving frequency RF is always correct and the drift occurs in the crystal oscillator 15, it is to be understood that our invention is equally applicable for the situation where the receiving frequency RF drifts and the crystal oscillator frequency is correct.

Therefore, while our invention has been described with reference to a particular embodiment, it is to be understood that modifications may be made without departing from the spirit of the invention or from the scope of the claims.

What we claim as new and desire to secure by Letters Patent of the United States is:

1. In a radio transceiver for use in cellular communication system having a plurality of selectable transmitting channels having transmitting frequencies TF spaced by a channel spacing frequency CSF and a corresponding plurality of selectable companion receiving channels having receiving frequencies RF spaced by said channel spacing frequency CSF and separated from the companion transmitting channels by a given frequency substantially greater than said channel spacing frequency, the improvement comprising:
    a. input means for said receiving frequencies RF;
    b. first means for producing a selected receiving local oscillator frequency RLOF;
    c. a first mixer coupled to said input means and to said first means and responsive to a selected receiving frequency RF and said selected receiving local oscillator frequency RLOF for producing a receiving intermediate frequency RIF;
    d. second means for producing a selected transmitting local oscillator frequency TLOF;
    e. a second mixer coupled to said first means and to said second means and responsive to said selected receiving local oscillator frequency RLOF and said selected transmitting local oscillator frequency TLOF for producing a selected transmitting frequency TF that is a companion to said selected receiving frequency RF;
    f. means for preventing the transmitter channel frequency from introducing undesirable audible beat notes in the transceiver as a result of drift in the frequency of said RLOF, TLOF or RF comprising means coupled to said first and second means for providing that said selected receiving local oscillator frequency RLOF and said selected transmitting local oscillator frequency TLOF have values such that said receiving intermediate frequency RIF which is equal to the difference between said receiving local oscillator frequency RLOF and said selected receiving frequency RF and a transmitting intermediate frequency TIF which is equal to the difference between said selected receiving frequency RF and said selected transmitting frequency TF, are spaced apart by a frequency spacing equal to or greater than one channel spacing frequency CSF;
    g. and output means coupled to said first mixer for substantially rejecting frequencies spaced from said receiving intermediate frequency RIF by said frequency spacing.

2. The improvement of claim 1 wherein said output means comprise a filter whose bandwidth is less than said channel spacing frequency CSF.

3. The improvement of claim 1 wherein said receiving intermediate frequency RIF is equal to the difference between said selected receiving local oscillator frequency RLOF and said selected receiving frequency RF, and wherein said selected transmitting frequency TF is equal to the difference between said selected receiving local oscillator frequency RLOF and said selected transmitting local oscillator frequency TLOF.

4. The improvement of claim 1 wherein said receiving intermediate frequency RIF is equal to the difference between said selected receiving local oscillator frequency RLOF and said selected receiving frequency RF, and wherein said selected transmitting frequency TF is equal to the sum of said selected receiving local oscillator frequency RLOF and said selected transmitting local oscillator frequency TLOF.

5. The improvement of claim 2 wherein said receiving intermediate frequency RIF is equal to the difference between said selected receiving local oscillator frequency RLOF and said selected receiving frequency RF, and wherein said selected transmitting frequency TF is equal to the difference between said selected receiving local oscillator frequency RLOF and said selected transmitting local oscillator frequency TLOF.

6. The improvement of claim 2 wherein said receiving intermediate frequency RIF is equal to the difference between said selected receiving local oscillator frequency RLOF and said selected receiving frequency RF, and wherein said selected transmitting frequency TF is equal to the sum of said selected receiving local oscillator frequency RLOF and said selected transmitting local oscillator frequency TLOF.

* * * * *

UNITED STATES PATENT AND TRADEMARK OFFICE
CERTIFICATE OF CORRECTION

PATENT NO. : 4,476,575

DATED : October 9, 1984

INVENTOR(S) : Earnest A. Franke, Frederick J. Highton

It is certified that error appears in the above-identified patent and that said Letters Patent is hereby corrected as shown below:

Col. 3, line 21, cancel "in" (second occurrence) and insert -- of --
Col. 3, line 37, cancel "915.030" (second occurence) and insert
    -- 915,030 --
Col. 5, line 53, after "in" insert -- a --

Signed and Sealed this

Ninth Day of July 1985

[SEAL]

Attest:

DONALD J. QUIGG

Attesting Officer     Acting Commissioner of Patents and Trademarks